(12) United States Patent
Zhao et al.

(10) Patent No.: US 7,773,503 B2
(45) Date of Patent: Aug. 10, 2010

(54) PROACTIVE CONGESTION CONTROL SCHEME FOR VOIP TRAFFIC ON IP ROUTERS

(75) Inventors: Yongdong Zhao, Pleasanton, CA (US); Shih-Chung Tom Soon, Dublin, CA (US); Sean Chen, Sunnyvale, CA (US); Zesen Chen, Pleasanton, CA (US); Wenge Chen, Pleasanton, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1381 days.

(21) Appl. No.: 11/148,654

(22) Filed: Jun. 9, 2005

(65) Prior Publication Data

US 2006/0280162 A1 Dec. 14, 2006

(51) Int. Cl.
*H04J 1/16* (2006.01)
(52) U.S. Cl. .............. 370/229; 370/237; 370/352; 370/395.21; 370/395.41; 370/468; 379/114.07; 379/221.07
(58) Field of Classification Search .......... 370/229, 370/395.21, 237, 352, 468, 477, 395.41; 379/221.07, 114.07
See application file for complete search history.

(56) References Cited

U.S. PATENT DOCUMENTS

| | | | |
|---|---|---|---|
| 6,529,499 B1 | 3/2003 | Doshi et al. | |
| 6,839,321 B1 * | 1/2005 | Chiruvolu | ................ 370/230.1 |
| 6,842,463 B1 | 1/2005 | Drwiega et al. | |
| 7,222,190 B2 * | 5/2007 | Klinker et al. | ............... 709/238 |
| 2002/0110112 A1 | 8/2002 | Tuomi | |
| 2003/0123388 A1 | 7/2003 | Bradd | |
| 2003/0156535 A1 | 8/2003 | Lebizay et al. | |
| 2004/0008627 A1 | 1/2004 | Garg et al. | |
| 2004/0057376 A1 | 3/2004 | Sasvari et al. | |
| 2004/0184444 A1 | 9/2004 | Aimoto et al. | |
| 2005/0052996 A1 | 3/2005 | Houck et al. | |
| 2006/0077962 A1 * | 4/2006 | Wu et al. | .................... 370/352 |

FOREIGN PATENT DOCUMENTS

EP 0999674 5/2000

OTHER PUBLICATIONS

Supplementary Search Report and Preliminary Opinion from copending European Patent Application No. 06759632 mailed Jun. 5, 2009.

* cited by examiner

*Primary Examiner*—Melur Ramakrishnaiah
*Assistant Examiner*—Yosef K Laekemariam

(57) ABSTRACT

VoIP traffic bandwidth through a router port is controlled so that it does not exceed a predetermined bandwidth to ensure a desired quality of service for all VoIP calls routed through the port. Information of a packet received by the port is extracted from a packet header. The information includes source and destination addresses and port numbers as well as the bandwidth used by the packet. If the packet is from an existing call, the packet is routed and the time the packet was received is updated. If the packet is from a new call, it is determined whether the port has sufficient bandwidth to route the new call. If the port has sufficient bandwidth, the packet is routed, bandwidth is allotted for subsequent packets from the new call, and the port information is updated to accept the subsequent packets. If the port does not have sufficient bandwidth, the packet is dropped.

19 Claims, 9 Drawing Sheets

PROACTIVE CONGESTION CONTROL SCHEME FOR VOIP TRAFFIC ON IP ROUTERS

FIELD OF THE INVENTION

The invention relates to a system and method for enforcing service level agreement for voice-over Internet protocol (VoIP) traffic on a communications network.

BACKGROUND

Voice-over Internet protocol (VoIP) services have steadily gained much attention from communication service providers, their customers and potential customers. VoIP is voice information delivered on a IP network. VoIP operates by sending voice information in discrete digital packets rather than using traditional circuit protocols of the public switched telephone network (PSTN). Communication service providers are using VoIP technology to offer end users such as individual consumers and businesses more cost-effective voice services across the provider's IP network infrastructure. These services are typically delivered to customers through a broadband access network, such as a digital subscriber line (DSL) access network. VoIP technology may be used as the foundation for new multimedia communication services that may address mobility and cost reduction concerns to customers. VoIP may also optimize the communication service providers' PSTN network costs, such as when used to transport bulk voice traffic over a shared IP data network.

To ensure the quality of communication messages sent using VoIP, VoIP imposes stringent quality of service (QoS) constraints on the IP network such as mouth-to-ear delay, jitter and packet loss. Mouth-to-ear delay is the delay incurred from the time the speaker initiates a vocal stream until the time the vocal stream is provided to the target (listener). The jitter is the variance of the delay experienced by different VoIP packets. The packet loss ratio is the ratio of the packets produced at the origin point to the packets received at the target point. The mouth-ear-delay for VoIP-based communications is limited to not more than 150 ms. The end-to-end jitter may be limited to less than 40 ms and packet loss ratio is limited to not more than 0.5%.

To achieve this QoS, the communication service provider may have to provision a large amount of network resources, such as bandwidth, to support the VoIP application. Network bandwidth used by VoIP traffic is dependent on the VoIP codec (encoder/decoder) and the packetization delay used by the VoIP codec. The VoIP traffic may travel through several IP routers between the origin and the target. Each of these IP routers have a number of ports with fixed amount of bandwidth that can be used for VoIP traffic. In order to achieve the desired QoS, the VoIP traffic volume has to be limited not to exceed the router port bandwidth.

In particular, some communication service providers use a so-called "leaky-bucket" based packet policer to control the amount of VoIP traffic on each IP router. The leaky bucket policer continuously monitors the amount of VoIP traffic received at each router port. When the policer determines that the VoIP traffic exceeds the pre-assigned bandwidth, it indiscriminately discards newly arrived VoIP packets. The packet discarding process continues for a period of time until the VoIP traffic conforms to the pre-assigned bandwidth. During the packet discarding process, packets are dropped from all VoIP calls.

However, such a leaky-bucket congestion control scheme has an undesirable effect on the VoIP services. For instance, when there are N VoIP calls in the network and the total bandwidth is less than the pre-assigned bandwidth, the quality of all the N calls are excellent. If an (N+1)th VoIP call starts and the pre-assigned bandwidth is exceeded, the congested IP router starts to randomly discard VoIP packets from all the (N+1) flows. The quality of all the (N+1) VoIP calls is degraded, reducing the QoS for all calls to below the desired level. This concomitantly creates dissatisfaction among the parties whose conversations are being relayed through that router port.

DETAILED DESCRIPTION

To ensure high-quality packetized voice calls using voice-over Internet protocol (VoIP), communications service providers may detect excessive bandwidth used for VoIP calls at a particular IP router due to the addition of a new VoIP call on the router and selectively drop packets of the new VoIP call or replace a terminated VoIP call with the new VoIP call to maintain a consistent quality of service (QoS) for all VoIP traffic through the IP router.

Figure 1:
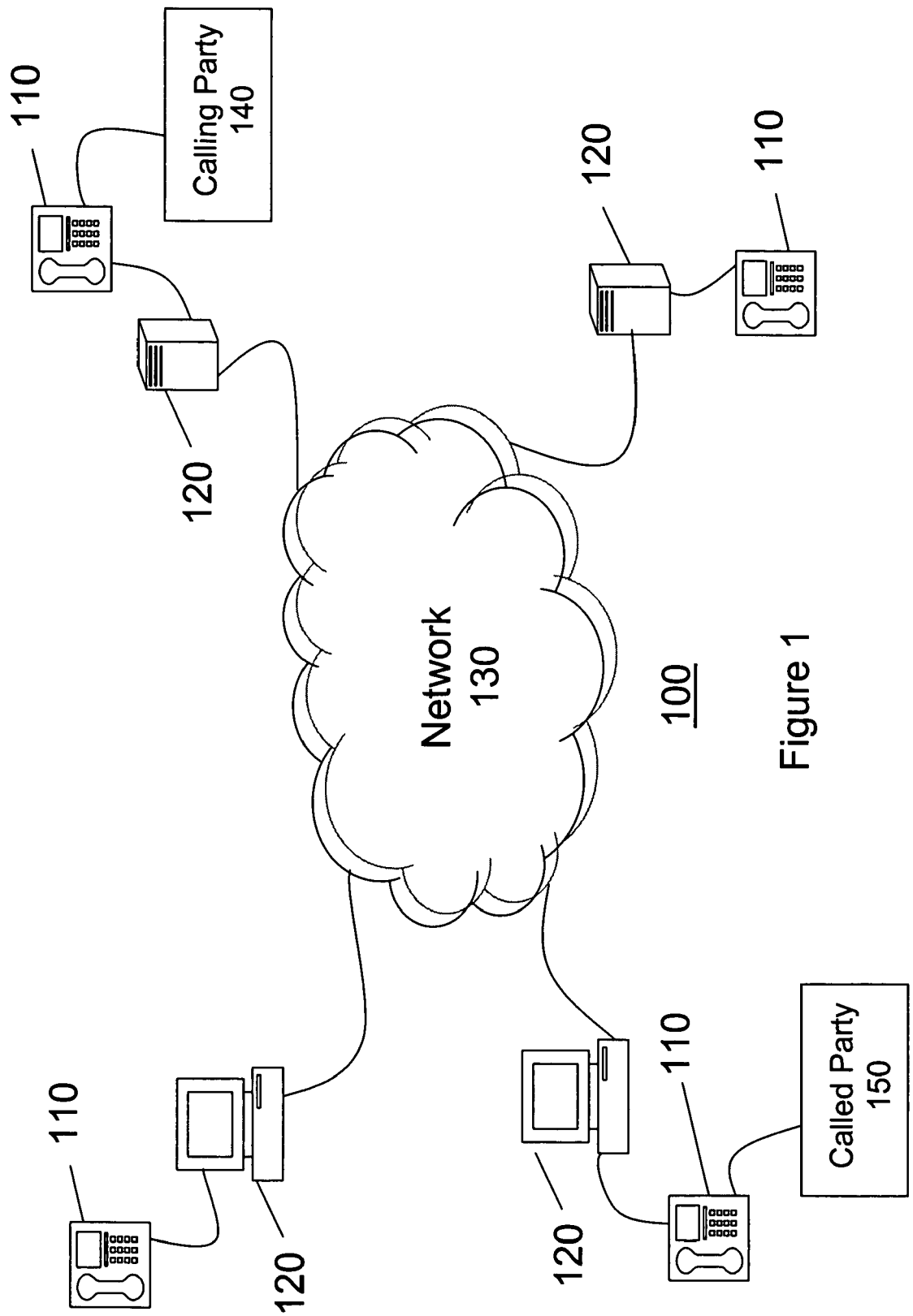
FIG. 1 is a block diagram of a VoIP communication system.

FIG. 1 is a block diagram of a communications system 100 that provides voice communications using packet-based messages. The communications system allows for a calling party 140 and a called party 150 to speak to each other in substantially real time. The communications system 100 includes communication devices 110 that connect to each other via processors 120 over a network 130 such as an Internet protocol (IP) network. The communications devices 110 include voice-type communications devices including telephones, such as phones used with landlines, mobile phones, satellite phones, Blackberry's and the like such as computers having a microphone and a speaker. The communications devices 110 may include hand-held or hands-free devices. The processors 120 may be included in such devices such as desk top computers, laptop computers and servers. The communications devices 110 and the processors 120 may be implemented as one or more physical devices.

The network 130 includes local area networks (LANs) and wide area networks (WANs), such as the Internet. The network 130 may be implemented with a network based virtual private network (VPN or NVPN) service. A VPN is a network that may be constructed by using public wires to connect nodes. The VPN may enable the communication service provider to create networks using a packet-switching network such as the Internet as the medium for transporting data. VPN systems may use encryption and other security mechanisms to ensure that only authorized users can access the network and that the data cannot be intercepted.

In a packet-switching network, voice and non-voice data in a message or file may be broken up into a sequence of packages. Each of these packages is provided with a wrapper that includes information of the sender's address, the receiver's address, the package's place in the entire message, and how the receiving computer can identify that the package arrived intact. Each data package, called a packet, is then sent off to its destination via a best available route. The route of one packet may be taken by all, some or none of the other packets in the message. The network 130 may balance the load across various pieces of equipment on a millisecond-by-millisecond basis. The packets may travel through copper cables, fiber optics, microwaves and satellites and the like. The recipient may communicate with the sender in substantially real time.

Being able to communicate in substantially real time means that communications, such as voice communications, from the calling party 140 to the called party 150 may occur substantially immediately. Conversely, substantially non-real time communications, such as sending a text message as a .WAV file via email, may cause a recipient of the message to take a few seconds, minutes, or longer to respond. Real time can also refer to events simulated by a computer at the same speed that they would occur if a human were to respond. The network 130 provides the users with the sense of real time communications that they may experience when speaking with each other using traditional circuit-committed telephone communications.

Figure 2:
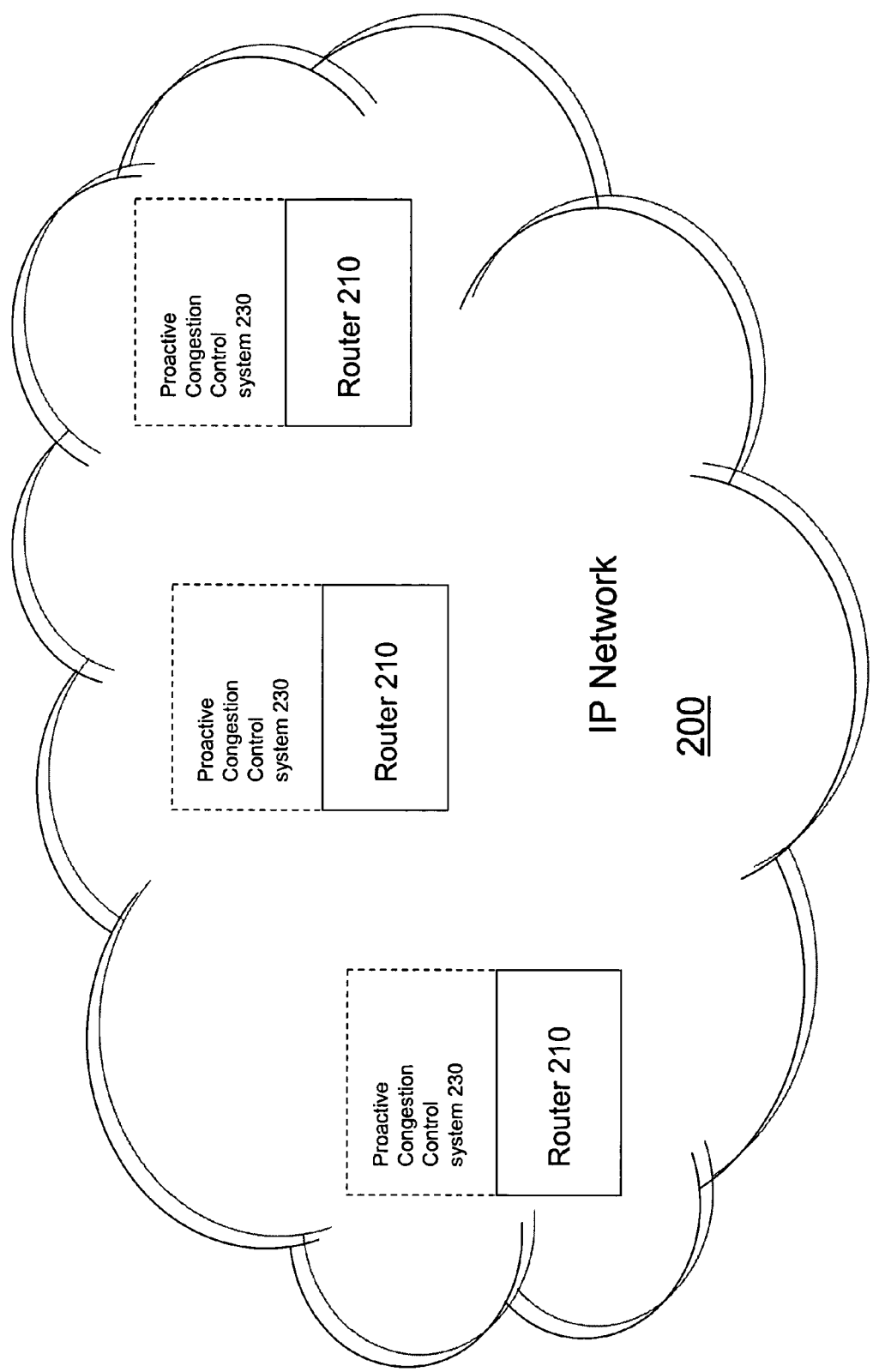
FIG. 2 is a block diagram illustrating exemplary components of the network of the communications system.

FIG. 2 is a block diagram illustrating exemplary components 200 of the network 130. The components 200 include multiple routers 210. Each router 210 includes a Proactive Congestion Control System 230. Each of the router 210 and Proactive Congestion Control System 230 includes logic such as software, hardware and/or firmware that may be used to control and monitor traffic through the router. The software includes operable routines stored in a memory medium. The router 210 may include specialized computers and applications that send the packet-based messages between networks, such as between a network of the calling party 140 and a network of the called party 150.

The Proactive Congestion Control System 230 allows communication service providers to detect a codec, and also to detect other network variables such as packet length and/or packetization delay used by a VoIP call. Information about the codec and packetization delay/bandwidth may be used to provide better quality service to the customers, as will be described in more detail below. The Proactive Congestion Control System 230 may be implemented together with or separate from the router 210.

Figure 3:
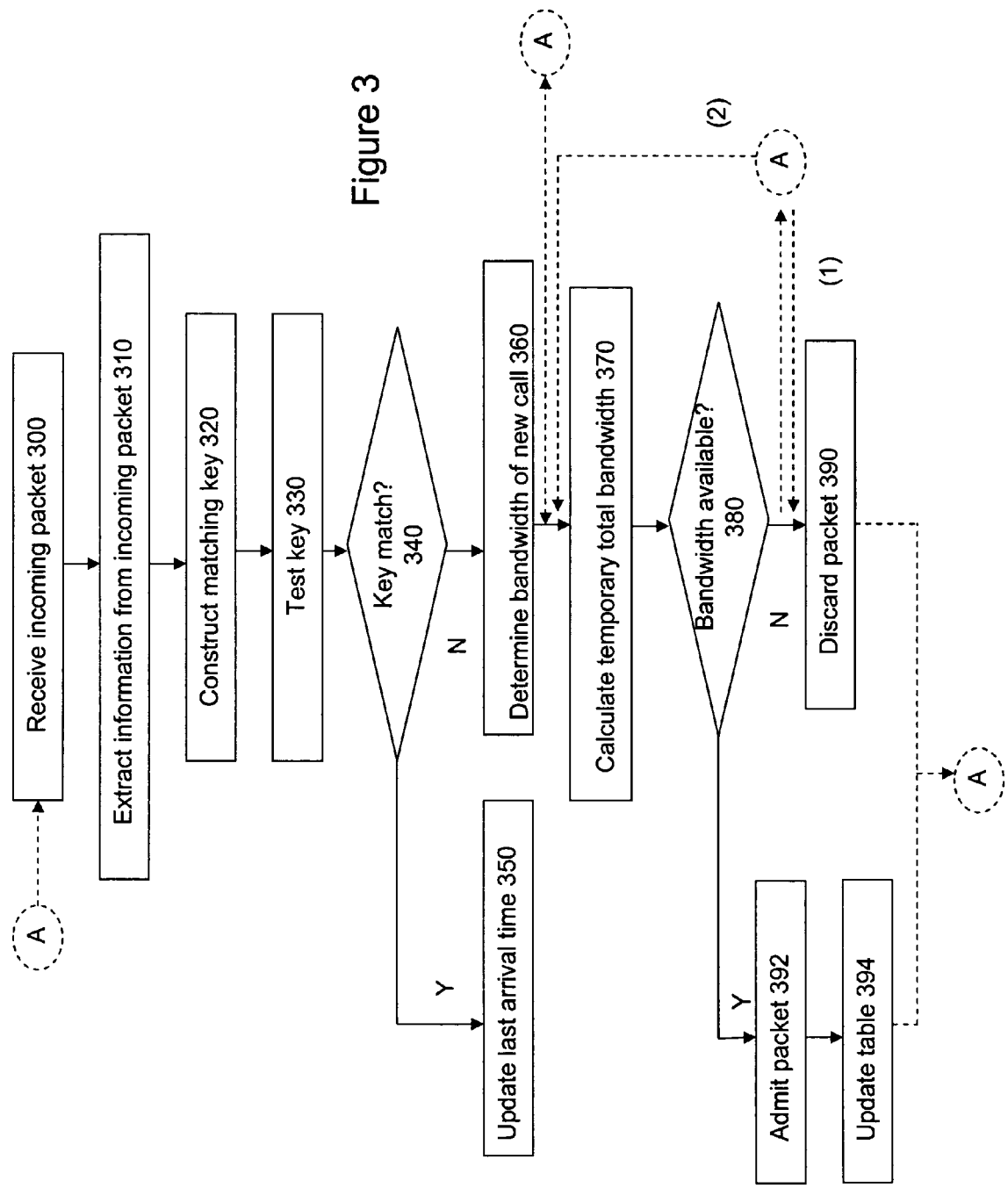
FIG. 3 is a flow chart illustrating the proactive congestion control scheme.

FIG. 3 is an overall flow chart of an operation of the Proactive Congestion Control System 230 of the communications system 100. In FIG. 3, the proactive congestion control scheme includes a number of individual blocks. The router first receives a VoIP packet at a port 300. The router extracts the source and destination IP addresses and the source and destination port numbers information from the packet received 310.

The router then constructs a matching key M_KEY 320 that contains the extracted information. In one example, the M_KEY=(source-IP_address, destination_IP_address, source_port_number, destination_port_number), as discussed below. This information can be arranged as desired to form the matching key.

The router then tests the matching key M_KEY against the stored VoIP Call Identifiers associated with the port 330 and determines whether or not a match exists 340.

If a match exists, then the router determines that the packet belongs to an existing VoIP call. The packet is admitted and the Last Arrival Time of the matching entry is stored is set to the current time of the router 350. Because the packet belongs to an existing VoIP call, and the maximum bandwidth for the codec and the packetization delay for the existing VoIP call has already been allotted, the pre-assigned bandwidth limit is not exceeded. Thus, the desired QoS is maintained for all existing VoIP calls through the port of the router.

If a match does not exist, however, then the router determines that the packet is from a new VoIP call and determines the bandwidth of the new VoIP call 360. The router extracts or reads stored codec information and packet length and then uses a global table (Table 1) to calculate the bandwidth of the new VoIP call.

Figure 4:
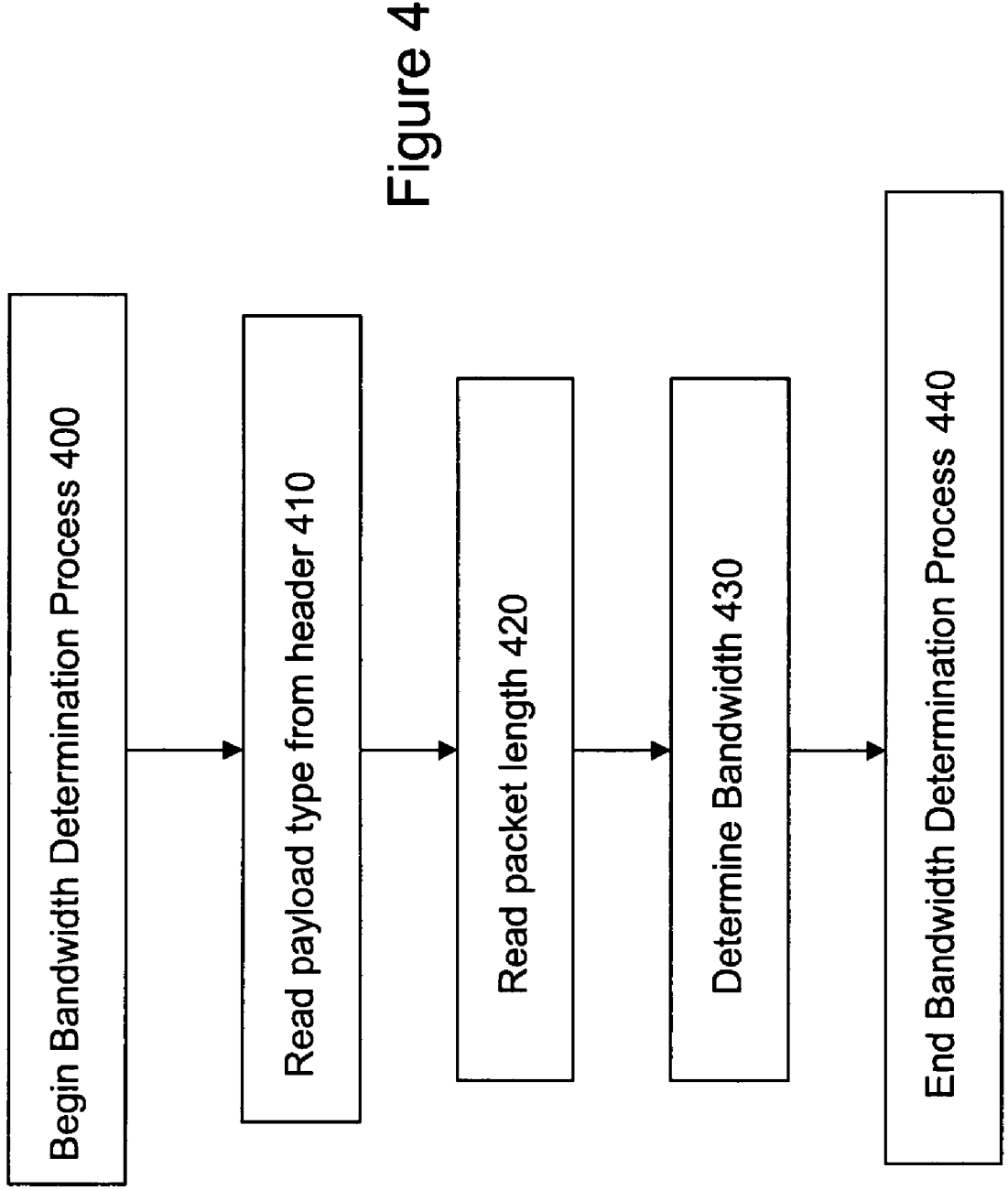
FIG. 4 is a flow chart illustrating the VoIP call bandwidth estimation process.

More specifically, FIG. 4 is a flow chart showing how the Proactive Congestion Control System 230 determines the bandwidth of the new VoIP call 380. At block 400, the router 210 begins to determine the bandwidth of packet-based messages received by the router 210.

Figure 5:
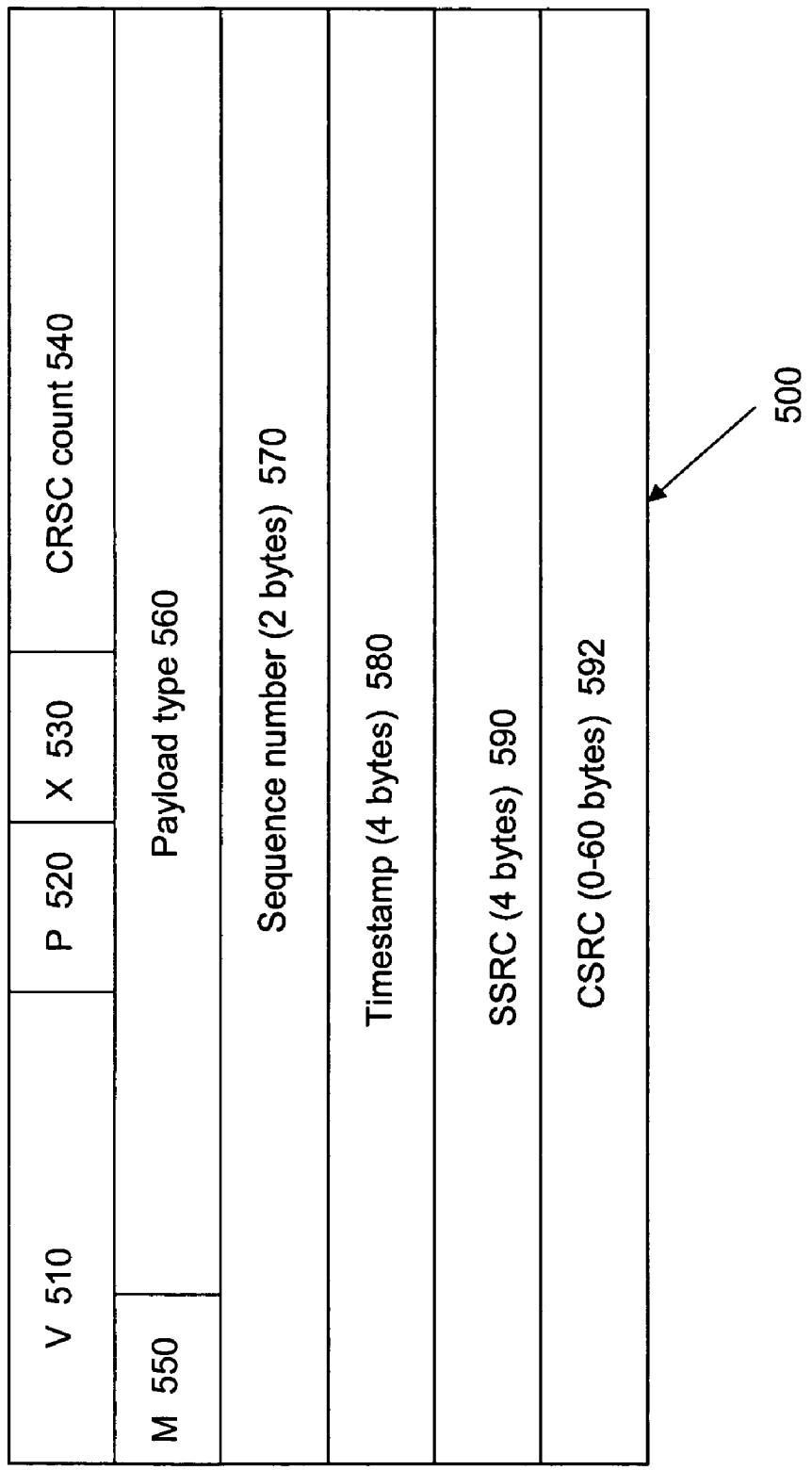
FIG. 5 is a diagram of an RTP header.
Figure 6:
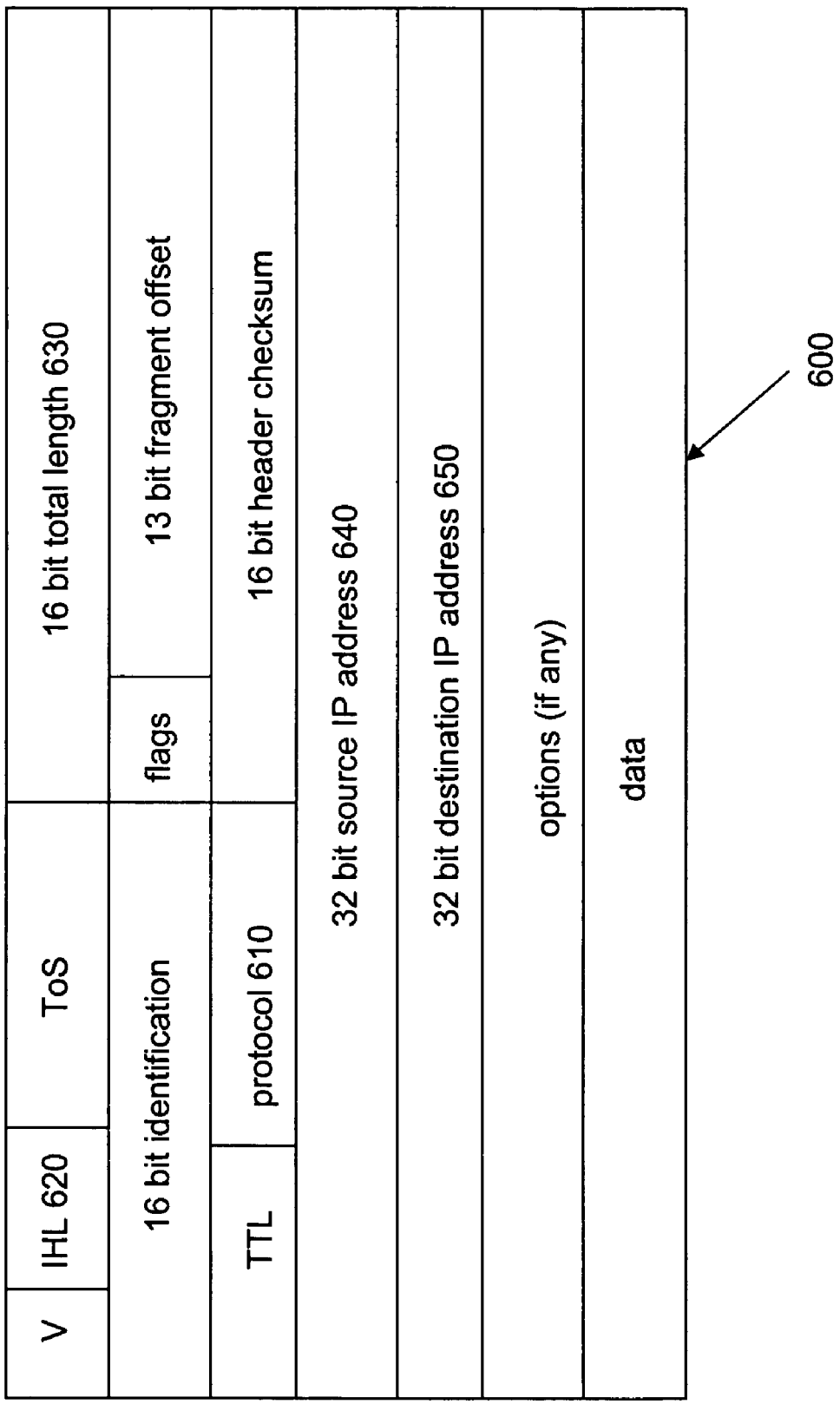
FIG. 6 is a diagram of an IP header.

At block 410, the router 210 extracts a payload type from a packet header or reads the payload type extracted in block 310, which has been stored. At block 420, the router 210 extracts the packet length from the packet header or reads the stored packet length extracted in block 310, which has also been stored. At block 430, the router 210 determines the bandwidth from the payload type and packet length and then continues the routine shown in FIG. 3 at block 440. The bandwidth is determined using Table 1 in the router 210. If the VoIP traffic is sent using Real-Time Transport Protocol (RTP), an Internet protocol for transmitting real-time data such as audio and video, the router inspects the RTP header. RTP does not guarantee real-time delivery of data, but provides mechanisms for the sending and receiving applications to support streaming data. The various headers are shown in FIGS. 5-6.

TABLE 1

Mapping Codec/Packet Length to bandwidth

| Codes and Packet Length (octet) | Required Bandwidth (kbps) |
|---|---|
| G.711, 120 | 96 |
| G.711, 200 | 80 |
| G.711, 280 | 74.7 |
| G.711, 460 | 72 |
| G.723ar53, 70 | 16 |
| G.723ar53, 80 | 10.7 |
| G.723ar53, 74 | 17.1 |
| G.723ar63, 88 | 11.7 |
| G.726r16, 70 | 48 |
| G.726r16, 80 | 32 |
| G.726r16, 100 | 26.7 |
| G.726r16, 120 | 24 |
| G.726r24, 30 | 56 |
| G.726r24, 100 | 40 |
| G.726r24, 130 | 34.7 |
| G.726r24, 160 | 32 |
| G.726r32, 80 | 64 |
| G.726r32, 120 | 48 |
| G.726r32, 160 | 42.7 |
| G.726r32, 200 | 40 |
| G.728, 70 | 48 |
| G.728, 80 | 32 |
| G.728, 100 | 26.7 |
| G.728, 120 | 24 |
| G.729, 60 | 40 |
| G.729, 70 | 24 |
| G.729, 30 | 18.7 |
| G.729, 80 | 16 |

FIG. 5 is a diagram of an RTP header 500. The RTP header 500 includes a version field (V) 510 that identifies the RTP version and a padding packet (P) 520, which, when set, indicates that the packet contains one or more additional padding octets at the end of the packet, which are not part of the payload. The RTP header 500 also includes a RExtension bit (X) 530, which, when set, indicates that the fixed header is followed by exactly one header extension, with a defined format. The RTP header 500 also includes a CSRC count 540 which contains the number of CSRC (contributing source) identifiers that follow the fixed header. Marker (M) 550 allows events such as frame boundaries to be marked in the packet stream. Payload type field 540 identifies the codec used by the VoIP call. The sequence number 570 increments by one for each RTP data packet sent, the timestamp 580 reflects the sampling instant of the first octet in the RTP data packet, the SSRC (synchronization source) 590 identifies the synchronization source, and the CSRC 592 identifies the contributing sources for the payload contained in the packet.

RTP may run on top of a User Datagram Protocol (UDP). UDP is a connectionless protocol that may send a message without establishing a connection with the recipient, by sending the message to the network 130 with a destination address. UDP/IP offers a direct way to send and receive datagrams over an IP network. The IP may use UDP for broadcasting RTP messages over a network.

FIG. 6 is a diagram of an IP header 600. Among other fields, the IP header 600 includes a protocol field 610 which identifies the type of transport protocol to be used, such as UDP. The IP header 600 also includes an IP header length (IHL) field 620 which identifies the length of the header in 32-bit words. A size of datagram field 630 includes the size of the header plus the data. The IP header also includes a 32-bit source IP address 640, which is the address of the sending node, and a 32-bit destination IP address 650, which is the address of the receiving node. The ToS field, which indicates the type of service, is not used. The flags section permits a large message to be split into a series of IP packets. The flag section, for example, contains a flag to indicate that the message is continued in the next IP packet and a flag to indicate that this particular IP packet should not be fragmented. The checksum permits detection of corruption of the IP header within a router.

Figure 7:
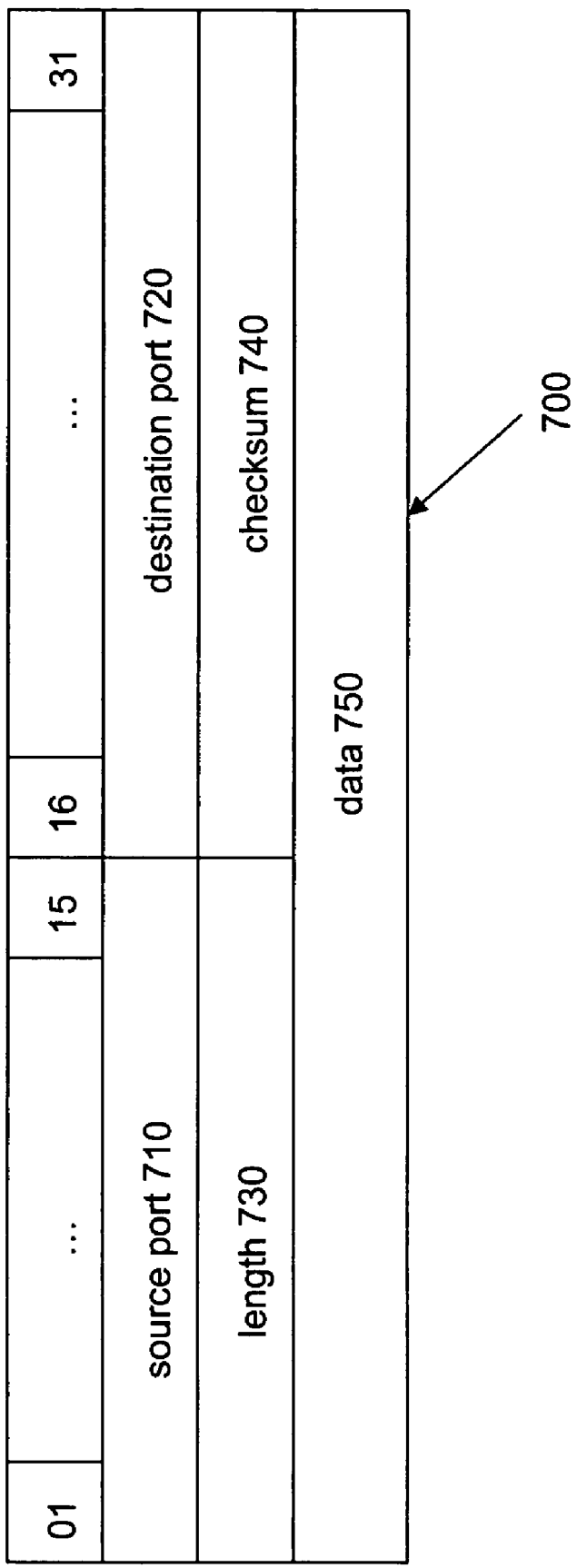
FIG. 7 is a diagram of a UDP header.

FIG. 7 is a diagram of a UDP header 700. The UDP header 700 includes a source port field 710 that is used to identify a port number of the sender. A destination port field 720 is also included which identifies a port that the packet is addressed to. A length field 730 includes the length, in bytes, of the UDP header and encapsulated data. A checksum field 740 may be used to help ensure an accurate transmission of data. The data is contained in a data filed 750.

Thus, again referring back to FIG. 4, the router 210 uses the VoIP traffic from the extracted payload type field 560 of the RTP header 500 to identify the VoIP codec at block 410. At block 420, the router 210 determines the packet length from the size field 630 of the IP header 600. Similarly, the source IP address 640 and destination IP address 650 pair and the source/destination port number pair of the VoIP packet from the UDP header 700 have been extracted at block 310. This information, as discussed above, is used to determine whether the packet is from a new VoIP call.

Turning back to FIG. 3, the router next adds the bandwidth calculated from the new VoIP call to the existing total bandwidth used to get a temporary total bandwidth used 370. Thus, the total VoIP traffic bandwidth if the new VoIP call were to be admitted by the port is determined.

After this, the router determines if the port has the bandwidth available to accept the new VoIP call 380.

More specifically, each port of the router handles N VoIP calls. Each port contains Table 2, which is specific to the port.

Table 2 retains the source and destination IP addresses and the source and destination port numbers that detail the origin of the packet and the destination of each VoIP call accepted by the port. Table 2 also contains the bandwidth of the packets in each VoIP call, as well as the last time a packet with the particular header matching that of Table 2 was received by the port.

TABLE 2

Active VoIP Calls and Bandwidth Requirements

| VoIP Call Identifier | Bandwidth (kbps) | Last arrival time (s) |
|---|---|---|
| (source IP address_1, destination IP address_1), (source port number_1, destination port number 1) | $BD_1$ | $T_1$ |
| (source IP address_2, destination IP address_2), (source port number_2, destination port number_2 | $BD_2$ | $T_2$ |
| ... | ... | ... |
| (source IP address_N, destination IP address_N), (source port number_N, destination port number_N) | $BD_N$ | $T_N$ |

In addition to extracting the information about the particular VoIP calls being transferred through the router, the router also continuously monitors the overall bandwidth of the VoIP traffic. As shown in Table 1, the amount of bandwidth used by the traffic from a VoIP call is determined from the VoIP codec and the packetization delay used by the VoIP encoder that generates the VoIP traffic. The proactive congestion control scheme is implemented with two parameters for each router port carrying VoIP traffic: BD_total and BD_limit. BD total is the aggregated bandwidth used by VoIP traffic on the port. BD_limit is the pre-assigned bandwidth limit that VoIP traffic can use from the router port to maintain the desired QoS. The proactive congestion control scheme stops the VoIP traffic from exceeding BD_limit.

In other words, the router continuously monitors the VoIP traffic on each port of the router that is receiving VoIP traffic. The router employs both Table 1 and Table 2 when the proactive congestion control scheme is used. In particular, as Table 2 tracks the active VoIP calls and the amount of bandwidth each VoIP call uses on a particular port, this table is per port based. Thus, if there are M ports in the router that are receiving VoIP traffic, then there are M Table 2 tables, one for each port. As Table 1 maps the VoIP codec and the VoIP packet length to the amount of bandwidth the VoIP call uses, this is a global table used by all the ports of the router.

After the router determines whether BD_total_temporary>BD limit in block 380, if the router determines that the bandwidth used by the new VoIP call makes the total bandwidth BD_total exceed the maximum allotted bandwidth of the port BD_limit (i.e. BD_total_temporary>BD_limit), then the router rejects the new packet 390. Thus, the packet from the new VoIP is discarded and the total bandwidth BD_total remains unchanged.

However, if the router determines that the port has the bandwidth available to accept the new VoIP call (i.e. If BD_total_temporary≦BD_limit), the packet is admitted by the port and routed by the router 392. Table 2 of the port is subsequently updated and stored with the information of the new VoIP call 394. That is, the identifier with the source and destination IP addresses and the source and destination port numbers, the bandwidth of the packets and the last time a packet with the particular identifier was received by the port is retained in Table 2 of the port.

Figure 8:
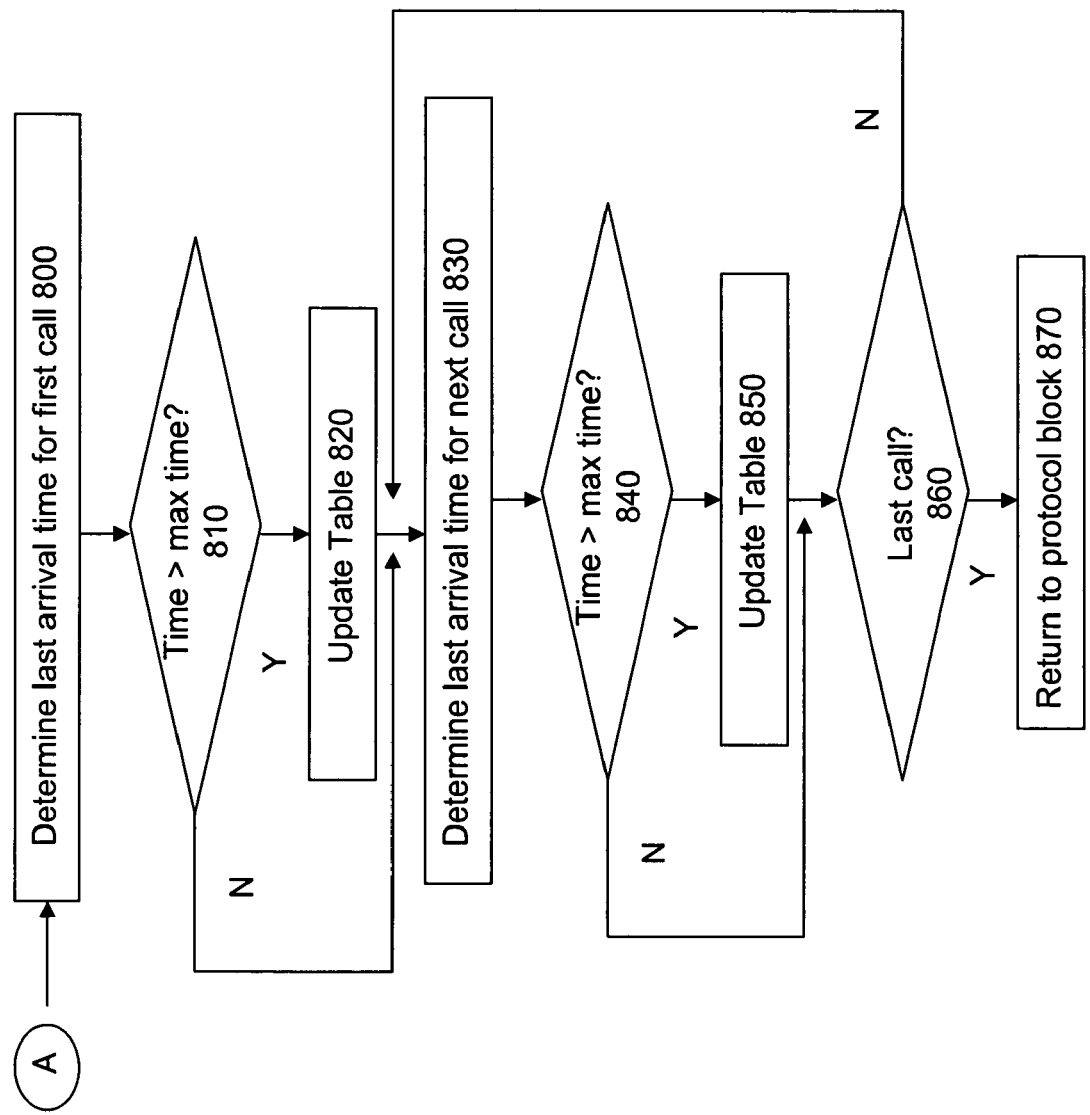
FIG. 8 is a flow chart illustrating a call dropping method.

In addition, the router periodically examines and updates Table 2 for each port receiving VoIP traffic to remove finished VoIP call entries from the table. The method of examination and updating is shown in FIG. 8 for one port. The router reviews the stored last arrival time Last_Arrival_Time for the first VoIP call selected 800. Note that any VoIP call can be selected first. For example, the VoIP call in the first row of Table 2, the VoIP call with the largest bandwidth, or the VoIP call with the earliest last arrival time may be selected first.

The router then calculates the difference between the present time Router_Time_Current and the last arrival time Last_Arrival_Time for the VoIP call and determines whether the difference is larger than a predetermined time Timeout 810. That is, the router calculates whether (Router_Time_Current-Last_Arrival_Time)>Timeout where Timeout is a pre-assigned parameter used to detect completed VoIP calls.

If the router determines that the difference is not larger than the predetermined time Timeout, the Last_Arrival_Time for the next VoIP call is extracted 830.

If the router determines that the difference is larger than the predetermined time Timeout, the VoIP call is considered ended and the appropriate entry is removed from Table 2 820. This frees bandwidth from the port of the router and subsequently may permit a new VoIP call to be handled. After Table 2 is updated to reflect the removal of the first VoIP call, the method continues as above, the Last_Arrival_Time for the next VoIP call is extracted 830.

Similar to the method used for the first VoIP call, router calculates the difference between the present time Router_Time_Current and the last arrival time Last_Arrival_Time for the next VoIP call and determines whether the difference is larger than a predetermined time Timeout 840. Note that, as above, any of the VoIP calls that have not been previously selected may be selected as the next VoIP call to be examined. For example, the VoIP call in the next row down of Table 2, the VoIP call with the next largest bandwidth, or the VoIP call with the next earliest last arrival time may be selected as the next VoIP examined.

If the router determines that the difference between the current time Router_Time_Current and the last arrival time Last_Arrival_Time for the VoIP call is larger than the predetermined time Timeout, the VoIP call is considered ended and the appropriate entry is removed from Table 2 850.

After the entry has been removed from Table 2 850, or if the router determines that the difference is not larger than the predetermined time Timeout, the router next checks to see if there are any VoIP calls remaining in Table 2 to be checked 860.

If there are more VoIP calls to be checked, the method moves on to the next VoIP call and repeats the determination 840 and removal 850, if appropriate, until the router determines that the last VoIP call on the port has been examined. When the router determines that the last VoIP call on the port has been examined, the method returns 870 to the method shown in FIG. 3.

Figure 9:
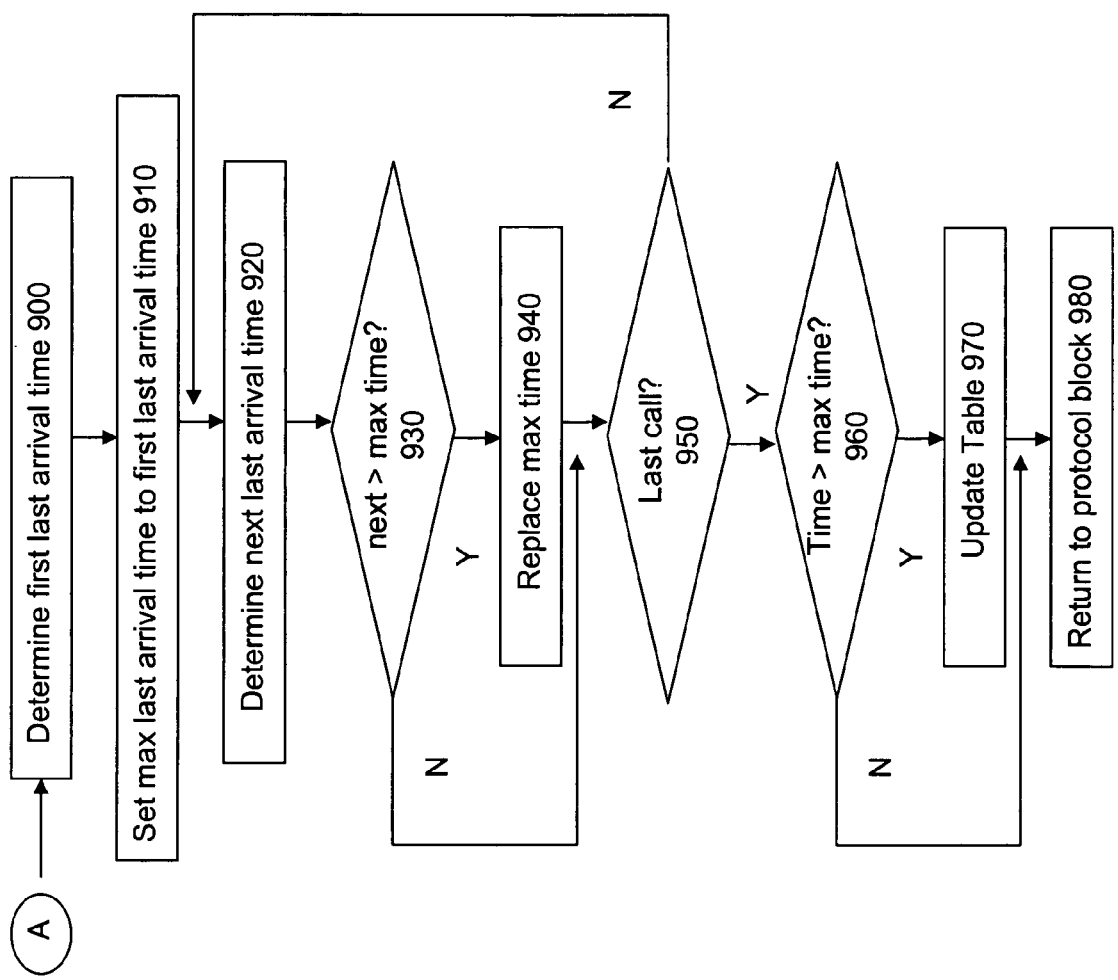
FIG. 9 is a flow chart illustrating another call dropping method.

Alternatively, the method shown in FIG. 9 may be used instead of the method shown in FIG. 8. In FIG. 9, the router examines Table 2 and determines the maximum last arrival time max_Last_Arrival_Time among the VoIP calls accepted by the port that are stored in Table 2. To accomplish this, in the embodiment shown in FIG. 9, the router determines the last arrival time Last_Arrival_Time for the first VoIP call selected 900.

The router then sets the maximum last arrival time max_Last_Arrival_Time to the last arrival time Last_Arrival_Time for the first VoIP call selected 910.

The router then examines the last arrival time Last_Arrival_Time for the next VoIP call selected 920 and determines if the last arrival time Last_Arrival_Time for the next VoIP call selected is greater than the last arrival time Last_Arrival_Time for first next VoIP call selected 930.

If the last arrival time Last_Arrival_Time for the next VoIP call selected is greater than the last arrival time Last_Arrival_Time for first next VoIP call selected, the router replaces the maximum last arrival time max_Last_Arrival_Time with the longer last arrival time Last_Arrival_Time of the next VoIP call 940.

Once the router replaces the maximum last arrival time max_Last_Arrival_Time with the longer last arrival time Last_Arrival_Time of the next VoIP call, or if the last arrival time Last_Arrival_Time for the next VoIP call selected is not greater than the last arrival time Last_Arrival_Time for first next VoIP call selected, the router determines whether the last selected VoIP call is the last VoIP call in Table 2 for the port 950.

If the last selected VoIP call is not the last VoIP call in Table 2 for the port, the router continues to examine last arrival time for the next VoIP call selected 920, determine if the last arrival time is greater than the current last arrival time 930 and replace the maximum last arrival time 940 if appropriate, until all of the VoIP calls in the port have been examined 950.

Once all of the VoIP calls in the port have been examined and the maximum last arrival time max_Last_Arrival_Time determined, the router then calculates the difference between the present time Router_Time_Current and the maximum last arrival time max_Last_Arrival_Time for the VoIP call and determines whether the difference is larger than the predetermined time Timeout 960. That is, the router calculates whether (Router_Time_Current-max_Last_Arrival_Time)>Timeout where Timeout is a pre-assigned parameter used to detect completed VoIP calls.

If the router determines that the difference is larger than the predetermined time Timeout, the VoIP call is considered ended and the appropriate entry is removed from Table 2 970. After Table 2 is updated to reflect the removal of the first VoIP call, or if the router determines that the difference is not larger than the predetermined time Timeout, the method returns 980 to the method shown in FIG. 3.

Either of the methods shown in FIG. 8 or 9 for determining whether or not one or more calls are to be dropped may be performed at several points during the procedure of FIG. 3. More specifically, as illustrated in FIG. 3, the methods of FIG. 8 or 9 may be performed before a packet is received, after the packet has either been accepted or dropped, or during processing of the packet.

In the last case, although the methods shown in FIGS. 8 and 9 may be performed at any intermediate point during packet processing, only the specific examples shown will be discussed. As illustrated in FIG. 3, after it has been concluded that the packet received is a packet from a new VoIP call and the bandwidth of the new call determined, the router can determine whether or not one or more existing VoIP calls are to be dropped before calculating the temporary total bandwidth of the port. Alternatively, the router can determine whether or not one or more existing VoIP calls are to be dropped only after determining that the temporary total bandwidth of the port exceeds the bandwidth limit.

In the latter case, after concluding that the temporary total bandwidth of the port exceeds the bandwidth limit, if the router does not drop any VoIP calls, the method continues and the packet is dropped 390, as shown by return path (1).

If the router drops one or more VoIP calls, the method can recalculate the temporary total bandwidth and determine whether the new temporary total bandwidth exceeds the bandwidth limit (i.e. whether the new VoIP call can now be taken). This is shown as return path (2). An internal flag may be set so that if the new temporary total bandwidth still exceeds the bandwidth limit, the router does not again check to see if any of the VoIP calls are to be dropped. That is, when a new packet is received, the router checks only once checks to see if any VoIP calls are to be dropped.

The processing procedure in FIGS. 3 and 8/9 is completed before the next packet from the same VoIP call arrives. Certain hardware acceleration techniques such as a TCAM (Ternary Content Addressable Memory) based search engine may be used to speed up implementation of these methods. However, given that the bandwidth for each VoIP call is small, the probability that two back-to-back packets are from the same VoIP call is extremely low. This reduces the complexity of the implementation of the methods. The Timeout parameters used for each port and/or router are selected so that the network link is not underutilized.

To ensure high-quality packetized voice calls using VoIP, a router through which the VoIP traffic is transferred monitors and may operate on the packets received. More particularly, the router detects the bandwidth used for VoIP calls in a particular port when a packet from a new VoIP call arrives and drops the packet if there is insufficient bandwidth available to accept the new call. Alternatively, the router may determine that bandwidth set aside for an existing VoIP call is free due to termination of the VoIP call, replace the terminated VoIP call with the new VoIP call, and route the new VoIP call. This permits the router to maintain a consistent QoS for all VoIP traffic through the router.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories; or a signal containing computer instructions being sent in a network environment. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

Accordingly, the present invention contemplates a computer readable medium containing instructions, or that which receives and executes instructions from a propagated signal so that a device connected to a network environment can send or receive voice, video or data, and to communicate over the network using the instructions. The instructions form one or more routines that are executable to permit the device to operate in a desired manner.

Additionally, it will be understood that a device of the present invention includes broadly any electronic device that provides voice, video or data communication, such as a telephone, a cordless telephone, a mobile phone, a cellular telephone, a Personal Digital Assistant (PDA), a set-top box, a computer, and/or a server.

While the invention has been described above by reference to various embodiments, it will be understood that many changes and modifications can be made without departing from the scope of the invention. It is therefore intended that the foregoing detailed description be understood as an illustration of the presently preferred embodiments of the invention, and not as a definition of the invention. It is only the following claims, including all equivalents, which are intended to define the scope of this invention.

We claim:

1. A method of limiting bandwidth through a port of a router that receives voice-over Internet protocol (VoIP) traffic, comprising:
   receiving a new VoIP packet;
   extracting identification information of the new packet from a header of the new packet;
   determining if the new packet is from a new VoIP call;
   if the new packet is from a new VoIP call:
      determining whether the port has sufficient bandwidth to route the new VoIP call;
         if the port has sufficient bandwidth to route the new VoIP call, routing the new packet, allotting a predetermined bandwidth for subsequent packets from the new VoIP call, and updating information of the port to accept the subsequent packets; and
         if the port does not have sufficient bandwidth to route the new VoIP call, dropping the new packet.

2. The method of claim 1, wherein extracting the identification information comprises extracting source and destination IP addresses and source and destination port numbers of the new packet.

3. The method of claim 1, wherein determining if the new packet is from a new VoIP call comprises constructing a matching key that contains the extracted information and testing the matching key against existing matching keys of the port.

4. The method of claim 1, further comprising routing the new packet if it is determined that the new packet contains the same identification information as stored identification information of a previously routed packet.

5. The method of claim 1, wherein determining whether the port has sufficient bandwidth to route the new VoIP call comprises:
   determining a bandwidth of the new packet from the identification information, the identification information including a codec used to create the new packet and a packet length of the new packet;

calculating a temporary total bandwidth of the port by adding the bandwidth of the new packet to a total bandwidth used by all VoIP calls currently routed by the port; and determining whether the temporary total bandwidth of the port exceeds a maximum allowable bandwidth of the port.

6. The method of claim 1, further comprising setting the maximum allowable bandwidth of the port using a desired quality of service for all VoIP traffic routed through the port.

7. The method of claim 1, further comprising storing the identification information as well as last arrival times of packets of all VoIP calls routed by the port in a table.

8. The method of claim 3, further comprising removing at least one VoIP call from the table if the last arrival time of a packet of the at least one VoIP call exceeds a maximum last arrival time.

9. The method of claim 3, further comprising determining all late VoIP calls having packets whose last arrival times exceed the maximum last arrival time and removing all late VoIP calls from the table.

10. The method of claim 8, wherein removing the at least one VoIP call from the table occurs after the new packet is either routed or dropped by the router.

11. The method of claim 8, wherein removing the at least one VoIP call from the table occurs after the new packet received and before the new packet is either routed or dropped by the router.

12. The method of claim 1, further comprising if the port does not have sufficient bandwidth to route the new VoIP call, before dropping the new packet:
   determining if bandwidth allotted to any VoIP calls should be freed; and
   if bandwidth allotted to one or more VoIP calls should be freed, freeing the bandwidth allotted to the one or more VoIP calls, and determining whether the port has sufficient bandwidth to route the new VoIP call after the bandwidth is freed.

13. The method of claim 1, further comprising:
   determining if bandwidth allotted to any VoIP calls should be freed before determining whether the port has sufficient bandwidth to route the new VoIP call; and
   if bandwidth allotted to one or more VoIP calls should be freed, freeing the bandwidth allotted to the one or more VoIP calls.

14. A computer readable medium containing instructions for limiting bandwidth through a port of a router that receives voice-over Internet protocol (VoIP) traffic, comprising:
   a first routine for extracting identification information of a new packet received by the port from a header of the new packet;
   a second routine for determining if the new packet is from a new VoIP call;
   if the new packet is from a new VoIP call:
      a third routine for determining whether the port has sufficient bandwidth to route the new VoIP call;
   if the port has sufficient bandwidth to route the new VoIP call, a fourth routine for routing the new packet, allotting a predetermined bandwidth for subsequent packets from the new VoIP call, and updating information of the port to route the subsequent packets; and
   if the port does not have sufficient bandwidth to route the new VoIP call, a fifth routine for dropping the new packet.

15. The software application of claim 14, wherein determining if the new packet is from a new VoIP call comprises constructing a matching key that contains the extracted information and testing the matching key against a table of existing matching keys of the port.

16. The software application of claim 14, wherein the third routine comprises:
   a sixth routine for determining a bandwidth of the new packet from the identification information, the identification information including a codec used to create the new packet and a packet length of the new packet;
   a seventh routine for calculating a temporary total bandwidth of the port by adding the bandwidth of the new packet to a total bandwidth used by all VoIP calls currently routed by the port; and
   a eight routine for determining whether the temporary total bandwidth of the port exceeds a maximum allowable bandwidth of the port.

17. The software application of claim 14, further comprising a ninth routine for removing at least one VoIP call from the table if a last arrival time of a packet of the at least one VoIP call exceeds a maximum last arrival time.

18. The software application of claim 14, further comprising if the port does not have sufficient bandwidth to route the new VoIP call, before dropping the new packet:
   a tenth routine for determining if bandwidth allotted to any VoIP calls should be freed; and
   if bandwidth allotted to one or more VoIP calls should be freed, an eleventh routine for freeing the bandwidth allotted to the one or more VoIP calls and determining whether the port has sufficient bandwidth to route the new VoIP call after the bandwidth is freed.

19. The software application of claim 14, further comprising:
   a twelfth routine for determining if bandwidth allotted to any VoIP calls should be freed before determining whether the port has sufficient bandwidth to route the new VoIP call; and
   if bandwidth allotted to one or more VoIP calls should be freed, a thirteenth routine for freeing the bandwidth allotted to the one or more VoIP calls.

* * * * *